(12) United States Patent
Hutchinson

(10) Patent No.: US 6,895,412 B1
(45) Date of Patent: May 17, 2005

(54) METHODS FOR DYNAMICALLY CONFIGURING THE CARDINALITY OF KEYWORD ATTRIBUTES

(75) Inventor: Wayne L. Hutchinson, Columbia, SC (US)

(73) Assignee: NCR Corporation, Dayton, OH (US)

(*) Notice: Subject to any disclaimer, the term of this patent is extended or adjusted under 35 U.S.C. 154(b) by 289 days.

(21) Appl. No.: 09/833,915

(22) Filed: Apr. 12, 2001

(51) Int. Cl.[7] .............................................. G06F 17/30
(52) U.S. Cl. ......................... 707/201; 707/1; 707/102; 707/104.1; 707/205; 709/203; 709/204
(58) Field of Search ................................ 705/2, 10, 36; 707/1, 2, 3, 5, 10, 102, 104.1, 200, 201, 4, 100, 101, 103, 205, 8; 709/203, 204, 218, 220, 107

(56) References Cited

U.S. PATENT DOCUMENTS

| | | | |
|---|---|---|---|
| 5,020,019 A | | 5/1991 | Ogawa |
| 5,560,005 A | * | 9/1996 | Hoover et al. ................. 707/10 |
| 5,664,171 A | | 9/1997 | Agrawal et al. |
| 5,761,653 A | | 6/1998 | Schiefer et al. |
| 5,845,273 A | * | 12/1998 | Jindal ............................ 707/1 |
| 5,864,841 A | | 1/1999 | Agrawal et al. |
| 5,899,986 A | | 5/1999 | Ziauddin |
| 5,926,816 A | * | 7/1999 | Bauer et al. ................... 707/8 |
| 6,581,062 B1 | * | 6/2003 | Draper et al. ............... 707/100 |

OTHER PUBLICATIONS

Heikki Hammainen et al, Distributed Form Management, Jan. 1990, ACM Press, vol. 8, Issue 1, pp. 50–76.*

* cited by examiner

Primary Examiner—Shahid Alam
Assistant Examiner—Fred Ehichioya
(74) Attorney, Agent, or Firm—Joseph P. Mehrle

(57) ABSTRACT

Methods are provided for dynamically configuring the cardinality of keyword attributes. A table definition is received including an identification field, a keyword field and a keyword value field. A first value is inserted into the keyword value field and associated with a first keyword residing in the keyword field. Furthermore, a second value is inserted into the keyword value field and associated with the first keyword. Moreover, a first identification, which is part of the identification field, is associated with the first keyword.

7 Claims, 3 Drawing Sheets

METHODS FOR DYNAMICALLY CONFIGURING THE CARDINALITY OF KEYWORD ATTRIBUTES

FIELD OF THE INVENTION

The present invention relates to methods for dynamically expanding the cardinality associated with keyword attributes in a data store.

BACKGROUND OF THE INVENTION

Information collected about customers in the retail industry is typically stored by individual retailers in one or more databases. The information is used by the retailer to facilitate communications with their customers, to assist with the billing of their customers, and to improve the marketing of products or services to their customers. The warehousing and mining of this information is often referred to as customer relationship management (CRM). A plethora of information technology services and tools have been created in recent years to assist retailers in developing CRM systems from their existing customer databases.

Many retailers are still finding the task of creating CRM systems daunting, because often each retailer will have multiple disparate legacy databases having information about customers, and these databases need to be integrated in order to achieve a complete customer data representation. Moreover, the quality and accuracy of any CRM system is directly dependent upon the completeness of the customer data on which it depends. Accordingly, one of the paramount prerequisites of any successful CRM system is to establish a centralized data representation of a customer.

To achieve this, requires a single database table with design consistency such that all the various permutations of similar customer attributes are identified within the table as a single consistent customer attribute. For example, consider two databases within a retail establishment, the first is used to record and market to customers purchasing by mail order catalogue, and the second is used to record and market to customers purchasing by phone.

Over the course of time, each of these databases may have been populated, enhanced, and utilized by two separate business units within the retail establishment. As a result, each database table may represent attributes associated with the same customer in mutually exclusive manners making the integration of the two databases a labor intensive and expensive process for the retail establishment.

For instance, if the first database table recorded the various phone numbers of a customer as fields or attributes with field names such as "phone1" "phone2," "phone3," and the like, while the second database table recorded the same phone numbers of the customer as fields or attributes with field names such as "home," "cell," "work," and the like, then creating a centralized representation of the customer would require mapping the disparate naming conventions to a single consistent naming convention. Moreover, if each database has any significant number of attributes associated with each customer within the database, then the mapping of the disparate attributes of the two databases to a consistent schema may be very expensive for the retail establishment. Furthermore, achieving a consistent naming convention for disparate database tables is largely a manual process which typically cannot be achieved through automated software processes.

As one skilled in the art will readily appreciate, as the number of disparate databases and disparate naming conventions for attributes of each database increases within a retail establishment, the expense of migrating to a consistent centralized database will corresponding increase as well. Therefore, many retail establishments have been slow to migrate towards the CRM paradigm, and they have not benefitted, to any significant degree, from the CRM services and tools available in the industry.

Accordingly, methods are needed wherein a single database table definition would permit the rapid and easy migration of disparate database tables into a single consistent table. To achieve this, the cardinality (e.g., the relationship between the attribute and the value of the attribute, such as by way of example only, one to one, one to many, and the like) associated with the database attributes must be dynamically modifiable. By permitting the attributes of a table definition, associated with a database table, to be dynamically configured a single table definition may be defined wherein disparate attributes are seamlessly integrated.

In this way, retail establishments and any other organization, may rapidly and efficiently integrate all the information within the establishment's disparate databases by migrating the databases to a single table definition using standard automated database extraction and database insertion operations. This permits establishments the ability to rapidly create powerful and centralized data warehouses without the need to eliminate or modify any established information collection processes.

Database designers cannot adequately predict all of the attributes that will ever be of interest, correspondingly a flexible design approach to accommodate any unforeseen attributes which develop over the course of time is desirable. The adaptability of a new approach, which would permit a single database design to integrate with multiple disparate customer database environments without changing the single design, is highly desirable.

SUMMARY OF THE INVENTION

Accordingly, an object of the invention is to provide methods for dynamically configuring the cardinality associated with keywords in a data store. A table definition, associated with a table of a data store, may be defined to include a keyword value field which when combined with keyword and identification fields may be used to form a composite key associated with the table.

The cardinality associated with any given keyword may be dynamically altered as unique values are added to the keyword value field, without the need to alter the table definition of the data store. In this way, disparate data stores having information relevant to a single keyword may be combined in a single table definition that permits the keyword cardinality to be expanded without redesigning the table definition to achieve the same. As a result, data design consistency may be achieved programmatically without the need for labor intensive redesigning or ad hoc creation of table definitions which are typically required when information from disparate tables are integrated into a single table.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims. To achieve the foregoing and other objects and in accordance with the purpose of the present invention, methods for dynamically configuring a cardinality associated with keyword attributes are provided.

One aspect of the present invention provides a method for dynamically configuring a cardinality of keyword attributes having executable instructions, wherein a table is received. The table has a table definition including an identification field, a keyword field, and a keyword value field. First and second values are inserted into the table and associated with a first keyword. The values are part of the keyword value field while the first keyword is part of the keyword field. Further, a first identification which is part of the identification field is associated with the first keyword and the values.

Another aspect of the present invention provides a method for expanding a table definition having executable instructions where a table definition is received. The table definition includes an identification field, a keyword field, and a keyword value field. First and second values of the keyword value field are associated with a first keyword of the keyword field.

Furthermore, a method for expanding a keyword by permitting one or more keyword values to be associated with each keyword is provided having executable instructions for receiving a table having an identification field, a keyword field, and a keyword value field. Moreover, a first keyword is received and associated with the keyword field. The first keyword has first and second values where each value is associated with the keyword value field.

Still other aspects of the present invention will become apparent to those skilled in the art from the following description of an exemplary embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

DETAILED DESCRIPTION

Figure 1:
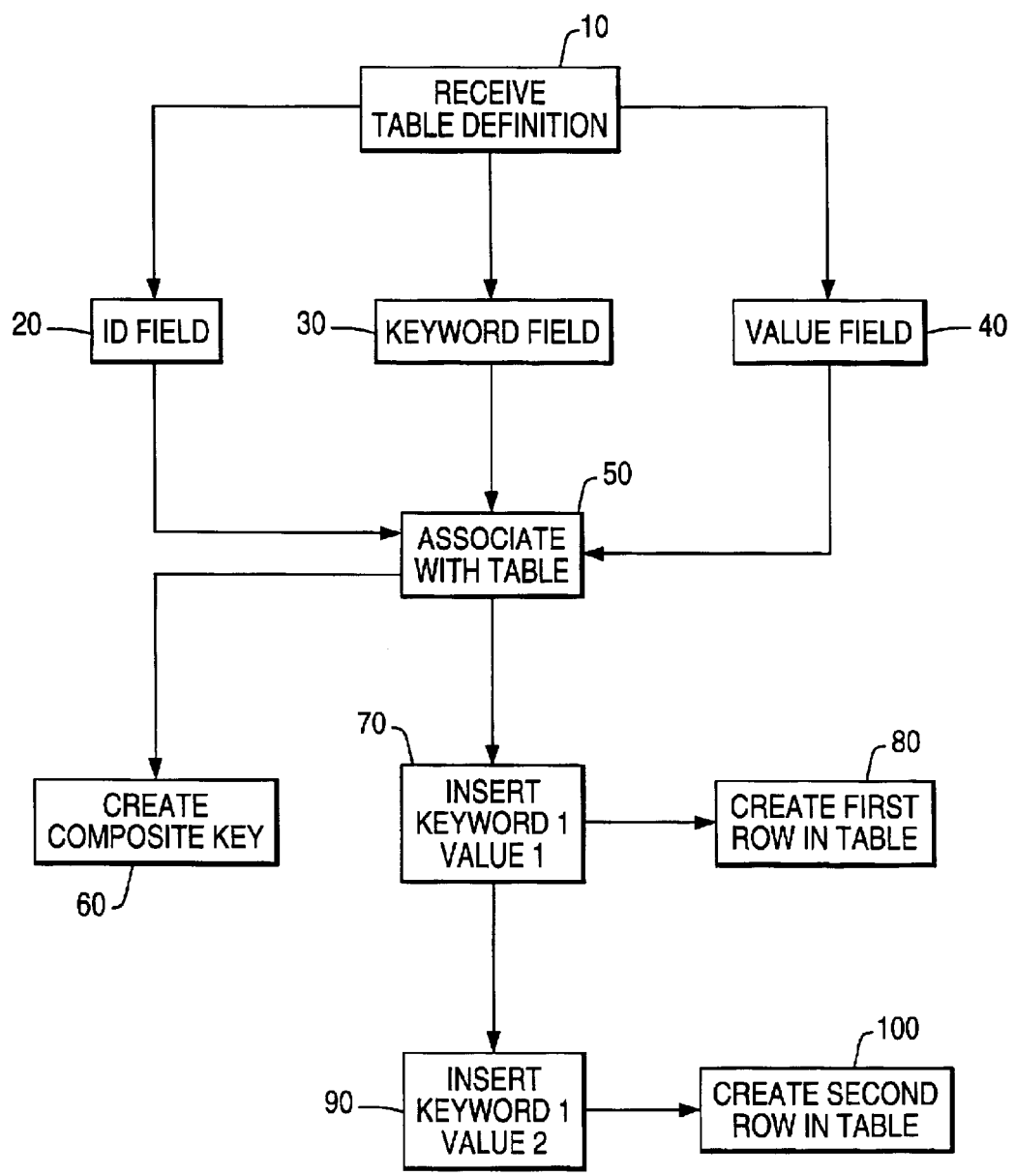
FIG. 1 depicts a flow diagram of a method for configuring a cardinality of keyword attributes.

The present invention provides methods for dynamically configuring the cardinality associated with keyword attributes of a data store. One embodiment of the present invention is implemented by providing a single table definition within the NCR Teradata database and utilizing standard SQL database operations to extract information from disparate databases which is then inserted into the single table definition.

However, as one skilled in the art will readily appreciate alternative database technologies and database application programming interface (API) languages (now known or hereafter developed) may also be readily employed. Moreover, as one skilled in the art will readily appreciate no database is needed at all, since the present invention could be written as a stand alone application providing its own database operations and its own database API.

Information gathered by organizations is typically stored in databases. A database is a set of software applications which requires the information to be stored in a structured manner into one or more data structures referred to as database tables. Each table within the database includes columns (e.g. fields) and rows (e.g. tuples or records). Typically, each table has a single key or a composite key where access to a row of the table may be acquired when the appropriate key is provided.

A single key consists of a single unique field within the table, such that no value within the unique field recurs within the table. A composite key includes two or more fields within the table, such that no set of values within the fields, used for purposes of key construction, are identical within the table.

Furthermore, the fields of the table are defined when the table is initially created, this schema is often referred to as a table definition. If new fields are later added to the table, which were not initially defined, then the table definition must be modified to accommodate the newly added fields. As one skilled in the art will readily appreciate, modifying a table definition is an expensive and undesirable operation for large databases, requiring the table indexes and the entire database utilizing the table to be reconfigured or rebuilt. Also, during this operation access to the database is often restricted and available computing cycles for other computing operations become scarce. As a result, large databases are typically rebuilt on dedicated computing devices or are rebuilt during off-peak usage hours, so a user's response time is not measurably affected.

Accordingly, great effort and time are usually expended in the designing and creation of a database table definition, so that the definition may last for a reasonable amount of time without the need for modification. Moreover, when multiple databases are migrated to a single database a single table definition will need to be created to achieve consistency among all fields which are logically the same but stored under different field names within the multiple databases.

Consider a table definition having three fields: Identification, Keyword, and Value; where the "Identification" field includes values L associated with uniquely identifying a specific customer of a retail establishment, these values may include, by way of example only, account numbers, social security numbers, last names, and the like. Moreover, an Identification field may be manufactured by additional software, such that a specific customer is resolved and given a unique Identification number by the additional software. This may be done, by way of example only, by analyzing information received from an unknown customer, and determining based on the information, such as address, last name, and/or social security number, that the customer in question is uniquely identifiable with a Identification number "n." Of course, as one skilled in the art will appreciate any number of data mining techniques may be used to identify a specific customer and assign a unique Identification number to that specific customer.

Furthermore the "Keyword" field includes string values which are the field names of other disparate database tables, such as by way of example only-"phone," "address," "cell," "name," and others. Moreover, the "Value" field includes values associated with the keyword field. For example, if a keyword field value consists of the string "name" then a corresponding value field may include an associated value of "Hutchinson."

By permitting the fields of a disparate database to be included as string values in the keyword field, then a single table definition having three fields as presented above may be used to permit the integration of multiple disparate database tables into the single integrated table definition presented above. In this way, a retail establishment having separate or conflicting field names within disparate databases for information regarding the same customer may be seamlessly migrated to a single table using the table definition presented. Standard database extraction is operations may then be used to extract the fields of a database associated with a customer and used in connection with standard database insertion operations to insert the extracted fields and their corresponding values into the table definition presented.

FIG. 1 depicts one flow diagram of a method for configuring a cardinality of keyword attributes. Initially, a table definition is received in step 10 having three fields defined: an "Identification" field defined in step 20, a "Keyword" field defined in step 30, and a "Value" field defined in step 40. The Identification field may include any information which is used to uniquely identify an account, customer, client, and the like. The Keyword field includes strings associated with fields of external data stores, and the Value field includes a value for a corresponding Keyword string. Although, as one skilled in the art will appreciate, no Identification field is required at all since this field may also be listed as a string name within the Keyword field itself.

The three fields are associated with a table in step 50 by creating a table definition. The table is created having a composite key which includes all three fields of the table definition in step 60. An initial Keyword string ("keyword1") is acquired from one or more external data stores along with an initial Value ("value1"). As previously presented, the Keyword string (e.g., keyword1) is a field name of an external table definition and the Value associated with the string (e.g., "value1"). Acquisition of keyword1 and value1 may be accomplished, by way of example only, by extracting these items from an external database using any standard SQL search query.

In step 70, keyword1 and value1 are inserted into the table, so as to create a first tuple or row in the table in step 80. Furthermore, keyword1 is also associated with a second value ("value2") and inserted in the table in step 90, so as to create a second tuple or row in the table in step 100.

Assume for purposes of illustration only, a customer of a retailer with an account number of "11111111." However, as previously presented the account number may just be used by another piece of software to assign a unique number to a customer associated with the account number. Or, alternatively the account number itself may be used as the Identification number, as discussed above. Further, the retailer maintains two disparate databases on customers, these databases are not integrated. Each database uniquely identifies the customer with the above account number, and each database contains a field entitled "phone" for the customer, however, in the first database a value associated with the phone field contains the customer's home phone number, while the second database includes a phone field's value containing the customer's work phone number.

In the present example, a table definition is established having three fields and two rows. The fields include "Identification," "Keyword," and "Value." Keyword1 is the string "phone," and it is associated with the Keyword field. Moreover, the Identification field includes the account number "11111111." The Value field has two entries which represent the customer's home phone number and work phone number. The resulting table has a first row including the tuple "11111111, phone, home-phone-number" and a second row including the tuple "11111111, phone, work-phone-number." Access to the table is obtained using a unique composite key which includes all three fields of the table. The table appears as follows:

| Identification | Keyword | Value |
|---|---|---|
| 1 1 1 1 1 1 1 1 | phone | home-phone-number (e.g., 000-0000) |
| 1 1 1 1 1 1 1 1 | phone | work-phone-number (e.g., 111-2222) |

In this way two disparate databases where integrated into a single database table definition where the Keyword phone which originally had a cardinality of one-to-one (e.g., the Keyword field value "phone" occurred only once within each database and had only one possible value, namely home or work phone number). Yet, by migrating to a table definition, as presented above, the cardinality associated with the keyword field is dynamically expanded to include a many-to-one relationship (e.g., the resulting table includes two phone Keywords, with each Keyword has one possible value, namely home or work phone number). Two disparate databases are merged into a single database table and the effective cardinality originally associated with fields of the disparate databases are dynamically modified during the transition.

As one skilled in the art will readily appreciate, the method depicted in FIG. 1 will readily permit automatic extraction and migration of multiple disparate database tables into a single integrated database table, thereby permitting a single centralized data store wherein the fields may be modified so as to change a cardinality associated therewith. This permits field extensibility and better data mining, since all information regarding a customer, may be centralized for purposes of data indexing, searching, retrieving, and extracting.

Figure 2:
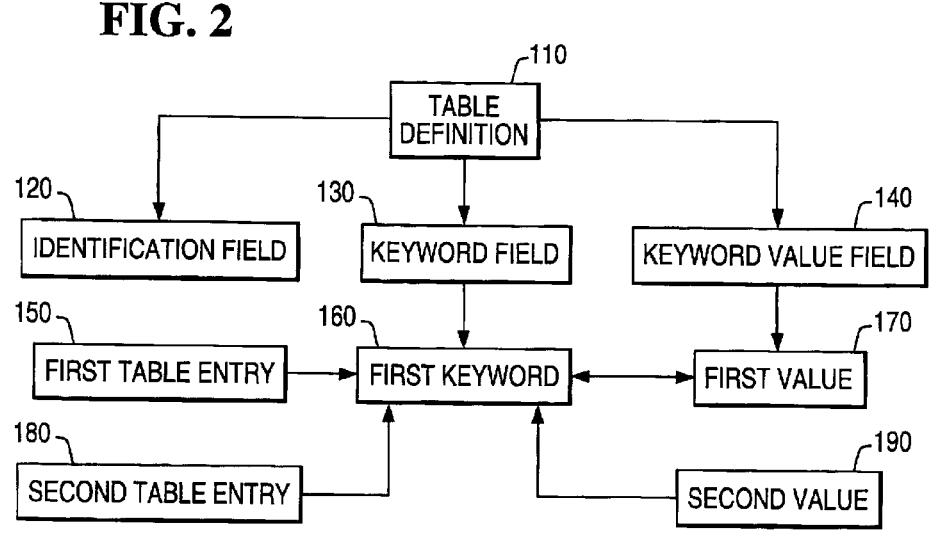
FIG. 2 depicts a flow diagram of a method for expanding a table definition.

FIG. 2 depicts one flow diagram of a method for expanding a table definition. A table definition used to define the attributes of a data store table is received in step 110. The table definition defines a single integrated table to include an "Identification" field in step 120, a "Keyword" field in step 130, and a "Keyword Value" field in step 140. A first value is identified in step 170 and a second value identified in step 190. The first and second values are not equal, and each value is independently associated with a first keyword in step 160.

The association between the first keyword and the first value creates a first table entry in step 150, and the association between the second keyword and the second value creates a second table entry in step 180. In this way, the table definition which was originally associated with two separate tables housing the first keyword is expanded by migrating the first keyword to a single integrated table definition of the present invention.

Accessing a unique row of a large database presents a number of performance issues, since often the table is indexed on its key, and if this key is modified regularly or comprises a large number of fields within the table, performance may actually degrade such that access to a single row becomes a linear function where each row is checked to determine if a match has occurred. In these situations, the maximum number of key queries that the database would need to perform would be a function of the total number of rows within the table itself. For example, a query against a table having 10,000 rows would require at a maximum 10,000 checks against each row before a guaranteed result could be returned from the query.

Figure 3:
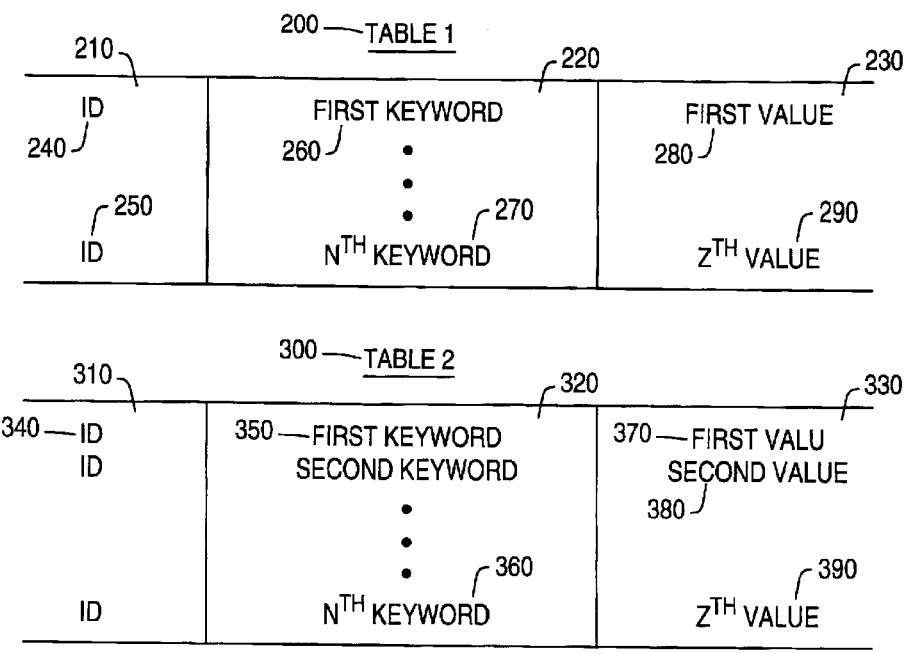
FIG. 3 depicts a schematic diagram of table definitions.

As one skilled in the art would readily appreciate, database retrieval time should be as direct as possible and should not be a serial or linear function. Correspondingly, two tables may be created for purposes of the present invention, as depicted in FIG. 3, where the access to the first table 200 ("Table1") creates an index offset into a second table 300 ("Table2").

Table1 200 includes three fields: "ID" 210, "Keyword" 220, and "Value" 230. Values for the ID field 210 may be repeated within Table 1 200, and need not be unique. However, values for the Keyword field 220 (e.g., First Keyword 260 through Nth Keyword 270) uniquely occur within Table1 200, as may values associated with the Value field 230 (e.g., First Value 280 through Zth Value 290). Although, since the Value field 230 is not part of the key, it is not required to be unique within Table 1 200. Accordingly, a key for Table 1 200 may include only the ID 210 and the Keyword 220 field. When a query to obtain a row of Table1 200 or Table2 300 is requested, the key is constructed using only the ID 210 and the Keyword 220 fields, with the smaller more compact Table1 200 being accessed initially and providing an index offset into the second larger Table2 300. This reduces the amount of search queries necessary to return a result, since serial access begins, if at all, within Table2 300 and only where Keyword field values are not unique.

Table2 300 includes three fields: "ID" 310, "Keyword" 320, and "Value" 330. However, in Table2 300 the composite key to access a row of the table includes the ID 310, Keyword 320, and Value 330 fields. Correspondingly, Keyword values, such as First Keyword 350 may be repeated within Table2 and only a complete tuple of table 300 is ensured to be unique. As a result, the key to Table2 300 includes all fields of Table2 300 as presented.

As one skilled in the art will readily appreciate, by decomposing a table definition of the present invention into two separate tables with the first being smaller and more compact and being used to provide an offset access into a second much larger table, performance may be substantially enhanced. Especially, if values are continually being added to the second table because updates to the entire database would not need to occur as each change is made, and the smaller compact table would rarely need updated. Moreover, the number of serial accesses of each row of Table2 300 is limited to those instances in which Keyword values are repeated and not unique.

Furthermore by using two tables, as presented above, a database server software can more easily enforce integrity constraints to preclude multiple values for a key when such a situation is not permissible. In this way, the integrity of a key's cardinality may be checked by using this multiple table feature to enforce one-to-one or one-to-many cardinality relationships.

Figure 4:
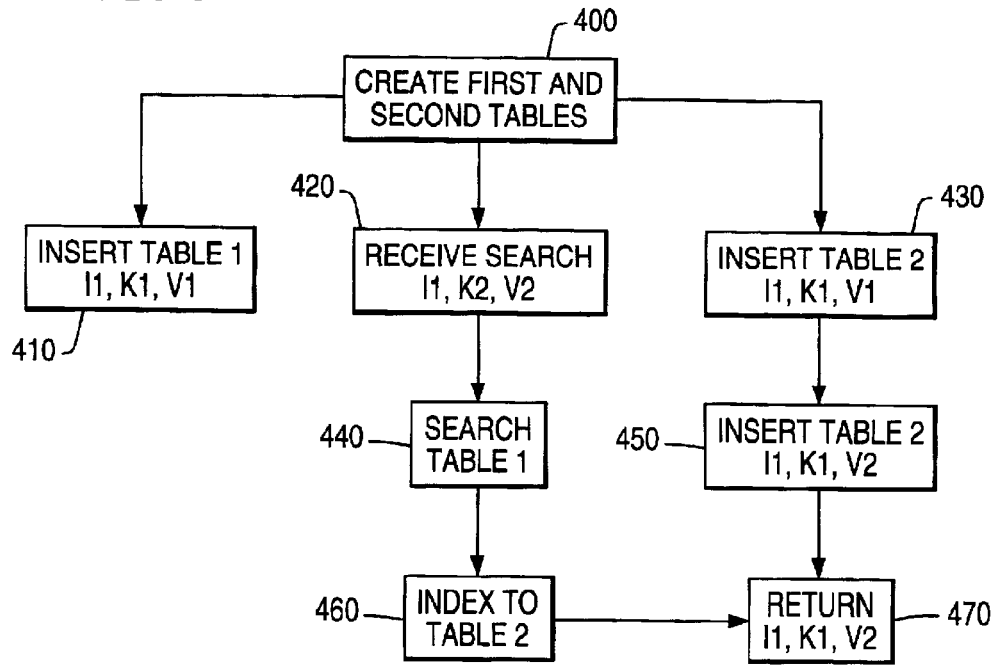
FIG. 4 depicts a flow diagram of an access method having two tables.

FIG. 4 depicts one flow diagram of an access method having two tables. A first and second table are created in step 400, with each table having three fields I, K, and V. The first table is a smaller more compact table and initially the values associated with uniquely occurring I and K fields are inserted therein in step 410 where a first tuple of the first table having the values I1, K1, and V1. Concurrently, the first tuple is inserted into a second table in step 430, however uniquely occurring values in the second table for the I and K field are not required, rather the entire tuple is all that is guaranteed to be unique within the second table.

Subsequently, a second tuple I1, K1, and V2 are inserted into the second table in step 450. At some later point in time after the first and second table have been populated, a search request is received in step 420 for the tuple I1, K1, and V2. This request precipitates a search of table 1 in step 440 where tuple I1, K1, and V1 are detected using the key pair I1 and K1 to access the first table, this detection also provides an index offset into the second table in step 460, such that searching of the second table begins with the tuple I1, K1, and V1. The tuple I1, K1, and V2 are immediately detected in the second table and returned in step 470.

Figure 5:
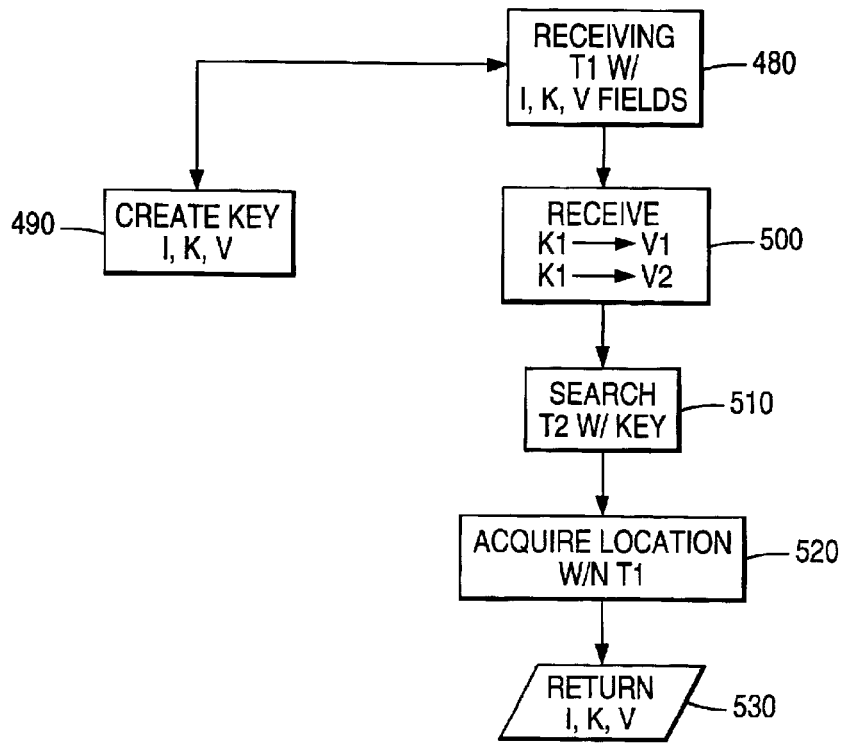
FIG. 5 depicts a flow diagram of a method for expanding a keyword.

FIG. 5 depicts one flow diagram of a method for expanding a keyword. Initially, table T1 is received in step 480 having three fields associated therewith, namely I, K, and V. A key is created to access T1 in step 490, the key consisting on the tuple I, K, and V. Subsequently an insertion occurs into TI where a K field has a value K1 repeated, and each individual K1 is associated with a different V value (e.g., V1 and V2, step 500). T1 may then be used to automatically construct a smaller table T2 which uses only uniquely occurring I and K values as its key.

Subsequently, a search may occur against table T2 in step 510 where index offset is returned into T1 in step 520, and a further search beginning at offset location reveals a desired tuple value in step 530 which is returned in response to the initial search request.

The foregoing description of an exemplary embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the attached claims.

What is claimed:

1. A method of dynamically configuring a cardinality of keyword attributes having executable instructions, comprising the steps of:
    generating a table having a table schema comprising an identification field, a keyword field, and a keyword value field;
    inserting a first value into the table wherein the first value is part of the keyword value field and associated with a first keyword which is part of the keyword field;
    inserting a second value into the table wherein the second value is part of the keyword value field and associated with the first keyword; and
    associating a first identification which is part of the identification field with the first keyword, the first value, and the second value within the table schema, and wherein the first keyword includes at least two field names, wherein each field name is associated with a separate external table and each field name is also associated with one of the first or second values of the keyword value field.

2. The method of claim 1, further comprising the steps of:
    ensuring the table schema remains unchanged after the insertions into the table.

3. The method of claim 1, further comprising the steps of:
    establishing a first row of the table to house the first identification, the first keyword, and the first value; and
    establishing a second row of the table to house the first identification, the first keyword, and the second value.

4. The method of claim 1, further comprising the steps of:
    creating a composite table key from the identification field, the keyword field, and the keyword value field.

5. The method of claim 1, wherein the fields of the table are operable to be searched.

6. The method of claim 1, wherein the first value is not equal to the second value.

7. The method of claim 1, wherein a cardinality between the keyword field and the keyword value field is a one-to-many relationship.

* * * * *